United States Patent Office 2,980,347
Patented Apr. 18, 1961

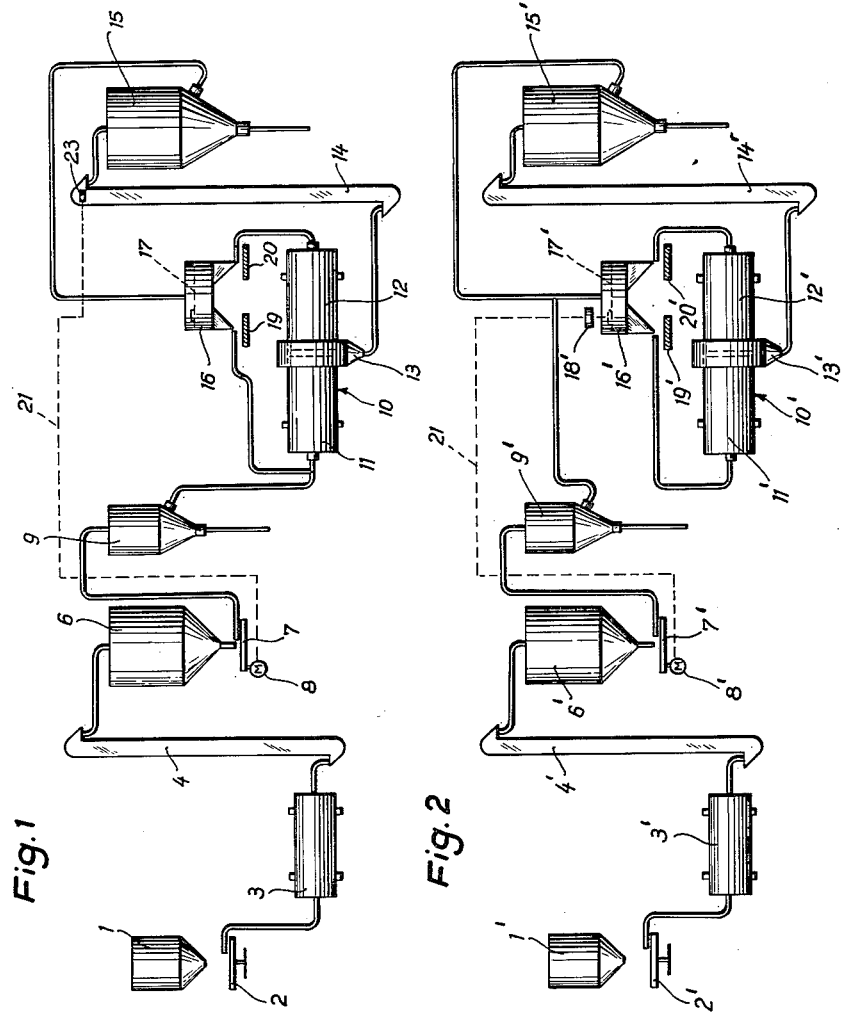

2,980,347
APPARATUS FOR HARD DISINTEGRATING AND SIFTING

Georg Claes, Ennigerloh, Westphalia, Germany, assignor to Firma Gebr. Hischmann, Maschinenfabrik, Ennigerloh, Westphalia, Germany, a corporation of Germany Filed Apr. 17, 1958, Ser. No. 729,215

Claims priority, application Germany Apr. 18, 1957

3 Claims. (Cl. 241—34)

The present invention relates to the hard-disintegration and sifting of goods to be ground, whereby goods to be ground which have been prebroken are fed to a rotary grinding device which comprises substantially a mill and a sifter.

It is one object of the present invention to provide a method of hard-disintegration and sifting, whereby not only a quite better efficiency is brought about for the used mills and sifting devices, but in addition a qualitatively improved final product is also achieved.

In the known methods for hard-disintegration and sifting of goods to be ground, as for instance a cement clinker, the goods to be ground which have been prebroken in a preliminary mill are fed directly to one or a plurality of fine mills. In a sifting system which is disposed behind the mills the coarse grain portion is separated from the fine grain portion and is returned again to the fine mills. This known method has the drawback that prebroken goods to be ground are fed to the fine mills, which prebroken goods to be ground had already an appreciable portion of fine grain. The added fine grain portion reduces appreciably, however, the efficiency of fine mills, since, as it is well known, the greatest labor has to be used in the mills for the conveyance of the goods to be ground, for the friction loss and for the elastic forming work.

In another known method these drawbacks are partly removed by an arrangement according to which the goods to be ground which have been prebroken in a preliminary mill are fed to a sifting device which is coupled in accordance with the series principle with one or a plurality of fine mills. The coarse grain portion which has been separated in the sifting device is fed to the fine mills and the goods which have been further broken up in the fine mills are returned to the sifting device, so that a continuous cycle takes place of the coarse grain portion through the mills and the sifting device. This known method has, however, also the drawback that the finest grain portion in the fine grain portion is extremely low in spite of the unfavorable efficiency, which fact causes, for instance if used for cement, a low quality.

All known methods have the additional drawback that due to irregular feeding of the apparatus with the prebroken goods to be ground, the fine mills and the sifting device are subjected to appreciable load fluctuations, so that upon overloading with the goods to be ground, not only the machine parts and the driving motors are overloaded, but the goods to be ground are broken up in appreciably insufficient manner. The desirable best filling feed for the mills cannot be maintained due to the irregular feeding with the goods to be ground.

Finally, the known methods have inherently also the drawback that separate mill devices had to be provided for the production of different qualities of goods to be ground.

It is, therefore, one object of the present invention to provide a method of hard-disintegration and sifting of goods to be ground wherein the prebroken goods, prior to their entrance into the rotary milling devices, are fed from a storage bunker to a preliminary sifting device by means of an adjustable conveyor device and are separated into a fine grain portion I and a coarse grain portion I and the coarse grain portion I is fed either directly or through an intermediate bunker to the rotary milling device, where it is further broken up and is separated into a fine grain portion II and a coarse grain portion II, whereby the coarse grain portion II is returned to the fine mills through the intermediate bunker.

This method in accordance with the present invention has at first the advantage that in addition to achieving a highly dispersed final product, the efficiency of the apparatus is appreciably increased compared with the known apparatus.

The high efficiency is brought about in such a manner that the grain portion which has been reduced to the desired final fineness is separated in the preliminary filling device, so that the fine mill is no more charged with the fine grain portion I. The fine mill is thus charged exclusively with the insufficiently reduced coarse grain portion I and the coarse grain portion II.

Furthermore, in accordance with the present invention the prebroken goods to be ground are fed to a rotary device over a conveyor device which is adjustable in accordance with the specific mill efficiency. The control of the conveyor device may be brought about, for instance, by a bunker indicator, indicating the level in said bunker, which indicator is disposed in the intermediate bunker and responsive to the degree of the filling of the bunker. There is, however, also the possibility to obtain the control by means of an acoustic ear which conveys impulses to the drive of the conveyor device depending upon the degree of filling of the mill or by means of a mechanical or electrical load measuring device in the conveyor device which is disposed behind the fine mill.

In advantageous manner the best filling degree may be maintained for a particular rotary milling device. Load fluctuations due to irregular feeding cannot occur anymore with an apparatus constructed in accordance with the present invention.

A further advantage is brought about by the present invention by an arrangement according to which in addition to the actually dispersed fine grain portion II, simultaneously a low dispersed fine grain portion I is provided. This is of particular importance, for instance in cement milling apparatus, where different cement qualities are desirable which are distinguished from each other merely by their degree of fineness.

In accordance with the present invention it is thus possible to provide, in an advantageous manner, a plurality of cement qualities by using a single milling device. In cement plants it is thus possible to combine, for instance, a fine grain portion I and a fine grain portion II.

Since the additional milling devices for other qualities of ground goods, which are necessary in the known methods may be dispensed with, the present invention provides appreciable savings in investments and in operation expenses.

Finally, the present invention brings about also the advantage that the method may be performed with the most different mills, sifting devices, a swell as conveyor devices.

With this and other objects in view which will become apparent in the following detailed description, the present invention will be clearly understood in connection with the accompanying drawings, in which:

Figure 1 is a schematic showing of a grinding apparatus designed in accordance with the present invention; and Fig. 2 is a schematic showing of a grinding apparatus designed in accordance with the present invention having a feeding run different from that shown in Fig. 1.

Referring now to the drawings, it may be readily ascertained that the apparatus disclosed in Figs. 1 and 2 comprises substantially a storage bunker 1 and 1', respectively, a preliminary mill 3 and 3', respectively, a storage bunker 6 and 6', respectively, an adjustable conveying device 7 and 7', respectively, a preliminary sifting device 9 and 9', respectively, a multi-chamber compound mill 10 and 10', respectively, a main sifting device 15 and 15', respectively, an intermediate bunker 16 and 16', respectively, and two adjustable conveying devices 19, 20 and 19', 20', respectively. Furthermore, several elevators 4, 14 and 4', 14', respectively, are arranged in said apparatus as well as a conveyor band scale 2 and 2', respectively.

The apparatus disclosed in Fig. 1 operates in the following manner:

The coarse grain stored in the bunker 1 is fed to the preliminary mill 3 in an exact dosage and previously determinable quantity from the conveyor band scale 2 which suitably is equipped with a weight indicator. The thus prebroken goods run over an elevator elevator 4 to the storage bunker 6. The preliminary mill 3 is of such measurements that it has a greater working capacity than that of the later arranged fine mill 10. It is possible thereby that such large quantities of prebroken goods are available in the storage bunker 6 that the fine mill 10 may run, for instance in three shifts, while the preliminary mill 3, for instance, runs only in one or two shifts.

The prebroken goods are conveyed from the storage bunker 6 by means of a conveying device 7, operated by a controllable motor 8 to the preliminary sifting device 9. The prebroken goods are separated in said preliminary sifter 9 to a fine grain portion I and a coarse grain portion I. While the fine grain portion I is now fed to some particular usage, the coarse grain portion I is fed to the chamber 11 of the multi-chamber compound mill 10.

The multi-chamber compound mill 10 is divided into two chambers 11 and 12 by means of a centrally disposed separating wall. The mill 10 is fed by a connecting branch disposed at each end side thereof, while the ground goods are removed substantially from the center of the mill 10 and are fed through a housing 13.

The coarse grain portion I fed into the chamber 11 moves toward the center of the fine mill 10 and is thereby ground. The ground goods removed from the fine mill 10 are then conveyed to the main sifting device 15 by means of an elevator 14. The main sifting device 15 separates the finely ground goods to a fine grain portion II, which may be removed for particular use and into a coarse grain portion II.

The coarse grain portion II is fed to an intermediate bunker 16 where the goods are divided in two conveying devices 19, 20 in a predetermined ratio to the two chambers 11 and 12.

In the arrangement shown in Fig. 1 of the drawings the total coarse grain portion I moves into the chamber 11 of the fine mill 10. Since, however, the flow of the coarse grain portion I is smaller in quantity than that of the coarse grain portion II, a portion of the coarse grain portion II must be fed towards the mill chamber 11 for the purpose of an equalized mill load. The ratio of the quantities for such flow is measured by the conveying devices 19 and 20.

In order to provide an equalized feeding of the fine mill 10, as shown in Fig. 2, a level indicator 18 is disposed in the intermediate bunker 16, which indicator is connected by means of an electrical conduit 21 with the controllable driving motor 8 of the conveying device 7. During equalized flow in the grinding a predetermined level 17 of the coarse grain portion II has been established in the intermediate bunker 16.

As soon as the level 17 is raised or lowered, the level indicator 18 registers such change, which indicator 18 in turn sends an electrical impulse over the electric conduit 21 to the driving motor 8 of the conveying device 7 and, thereby slows down or accelerates the conveying device 7, depending upon a predetermined level of the coarse grain portion II in the intermediate bunker 16.

By such control it is arranged that in case of an overload of the fine mill 10 due to a greater quantity flow of material, the level 17 is raised in the intermediate bunker 16 and thereby lowers the amount of conveyance in the conveying device 7 so that the best degree of filling for the fine mill 10 is automatically restored.

An equalized feeding may be obtained, however, for instance also in such a manner that an acoustic ear is provided adjacent the mill 10, as is known already, which causes impulses to the motor 8 for the conveying device 7 created by the sound depending upon the degree of filling of the mill 10. Thus, instead of the level indicator 18, the acoustic ear is provided, which dependent upon the grinding noises, which constitute a measure of the filling of the mill 10, convey control impulses to the motor 8, causing, respectively, acceleration and retardation of the latter. In case of such arrangement the level indicator 18 and the intermediate bunker 16 are eliminated from the direct feeding of the mill 10, so that a direct cycle is created between the mill 10 and the sifting device 15.

Another embodiment of the control device may be of such construction that a sensing means in form of a load meter 23 (Fig. 1) is provided in the elevator 14 which is disposed between the mill 10 and the sifting device 15, which load meter 23 depending upon the load, that means depending upon the amount of the goods emerging from the mill 10 sends electrical impluses through the conduit 21 to the motor 8 of the conveying device 7. Such load meter 23 may be constructed as a weight meter or as an electrical power meter, which is connected with the driving motor 8 for the elevator 14.

The fine grain portion I removed from the preliminary sifting device 9 may be fed to a particular use, for instance with a very small proportion of finest grain, which fine grain portion I may constitute the quality I. The smaller proportion of finest grain in the fine grain portion I and the smaller specific surface, respectively, is brought about, for instance by the use of a short tubular mill 3. The goods are, however, ground much finer in the fine mill 10 and the proportion of finest grain and the specific surface is, therefore, appreciably higher. The fine grain portion II is, therefore, fed to some particular use suitably as improved quality II. The quality I is achieved from the fine grain portion I due to its coarser grain, and quality II is achieved from the fine grain portion II.

There is yet the possibly to intermix the fine grain portions II and I and thus to produce a final product of medium quality or to coordinate both sifting devices 9 and 15 to each other so that they produce the same quality.

Referring now to Fig. 2, the second apparatus differs from the one disclosed in Fig. 1, aside from the particular means for controlling the motor 8, merely by the arrangement that the coarse grain portion I separated in the preliminary sifter 9' of the revolving milling device, which comprises the fine mill 10', the elevator 14', the main sifting device 15' and the intermediate bunker 16', is not fed through the fine mill 10' but through the intermediate bunker 16'. By this arrangement, the coarse grain portion I is suitably mixed with the coarse grain portion II, in order to divide equally the fraction proportions. Furthermore, this apparatus operates in the same manner as that described in Fig. 1.

The present invention is not limited to the two embodiments disclosed in the drawings, since the number as well as the type of the individual mills, sifting devices, conveying devices and elevators may be changed.

While I have disclosed several embodiments of the present invention, it is to be understood that these embodiments are given by example only and not in a limiting sense, the scope of the present invention being determined by the objects and the claims.

I claim:

1. In an apparatus for reducing and sifting of goods to be ground, means for pre-breaking said goods, a preliminary sifting device, first means including driving means for conveying said goods discharged from said pre-breaking means to said preliminary sifting device, a fine grinding mill, an intermediate bunker having variable discharge means, a first discharge means of said preliminary sifting device adapted to discharge a first fine grain portion of a first order, second means for conveying a discharge of a first coarse grain portion of a first order from said preliminary sifting device to said fine grinding mill, third means for conveying said goods from said intermediate bunker to said fine grinding mill, a main sifting device, fourth means for conveying the discharge of said fine grinding mill to said main sifting device, a second discharge means of said main sifting device adapted to discharge a second fine grain portion of a second order, and fifth means for conveying a discharge of a second coarse grain portion of a second order from said main sifting device to said intermediate bunker, and a single sensing means responsive to the quantity produced of said fine grain portion of a second order for controlling said driving means of said first conveying means.

2. The apparatus, as set forth in claim 1, wherein said fourth conveying means include an elevator having a driving motor and said sensing means being responsive to the load of said fine grain portion of a second order conveyed by said elevator.

3. The apparatus, as set forth in claim 1, which includes a sixth means for conveying said coarse grain portion of said first order directly to said fine grinding mill.

References Cited in the file of this patent

UNITED STATES PATENTS

| | | |
|---|---|---|
| 1,635,527 | Barthelmess | July 17, 1927 |
| 1,748,920 | Newhouse | Feb. 25, 1930 |
| 1,902,413 | Miller | Mar. 21, 1933 |
| 1,943,817 | Dunton | Jan. 16, 1934 |
| 2,047,136 | Doyle | July 7, 1936 |
| 2,148,447 | Dundas et al. | Feb. 28, 1939 |
| 2,289,727 | Randolph | July 14, 1942 |
| 2,471,043 | Schenck | May 24, 1949 |
| 2,554,450 | Ayers | May 22, 1951 |
| 2,627,375 | Grondal et al. | Feb. 3, 1953 |
| 2,668,667 | Fern | Feb. 9, 1954 |
| 2,766,939 | Weston | Oct. 16, 1956 |
| 2,879,004 | Dodds et al. | Mar. 24, 1959 |